Dec. 9, 1958 P. H. TIMOTHY ET AL 2,863,204
PIPE COATING METHOD AND APPARATUS
Filed March 8, 1955 6 Sheets-Sheet 1
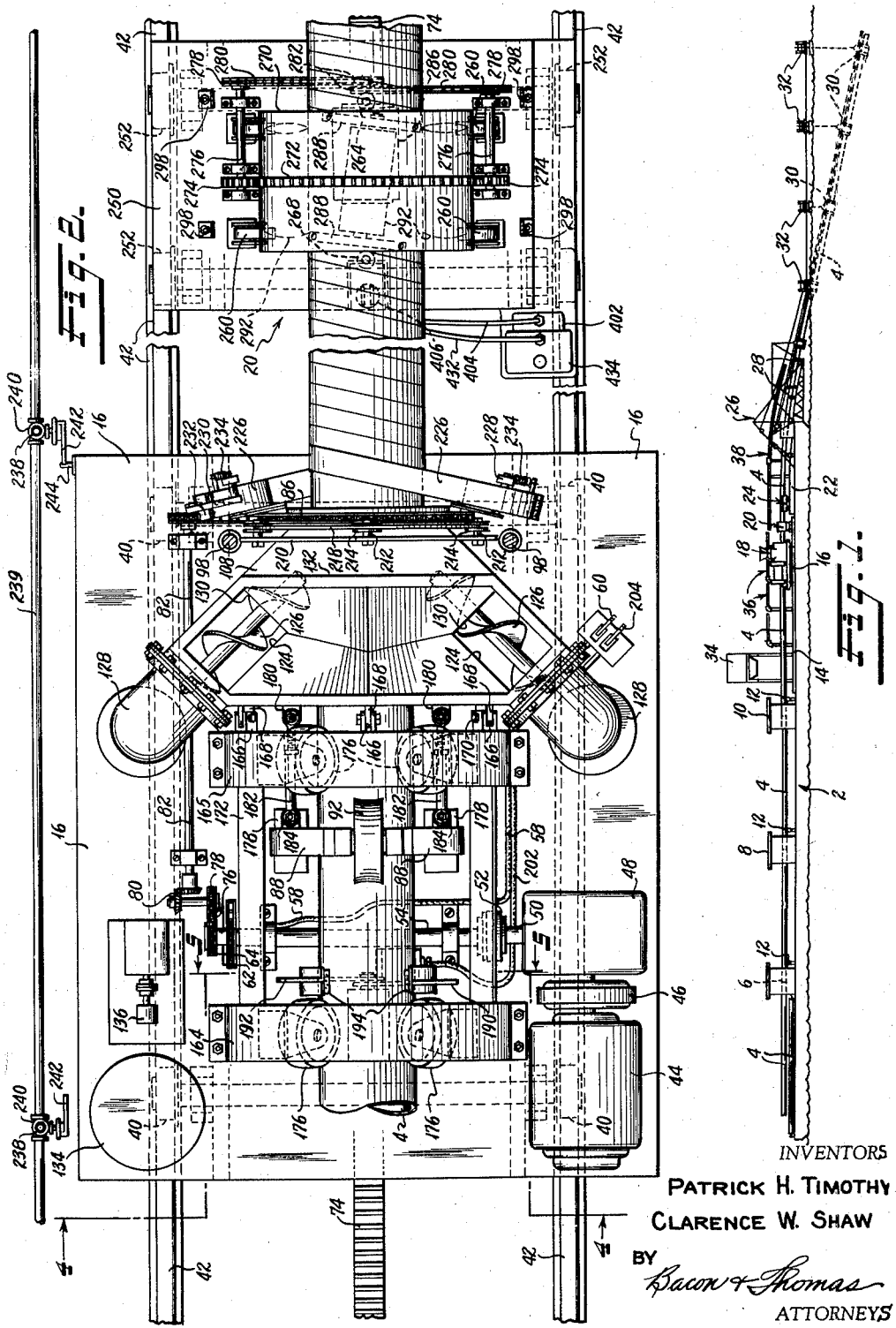
INVENTORS
PATRICK H. TIMOTHY
CLARENCE W. SHAW
BY
*Bacon & Thomas*
ATTORNEYS

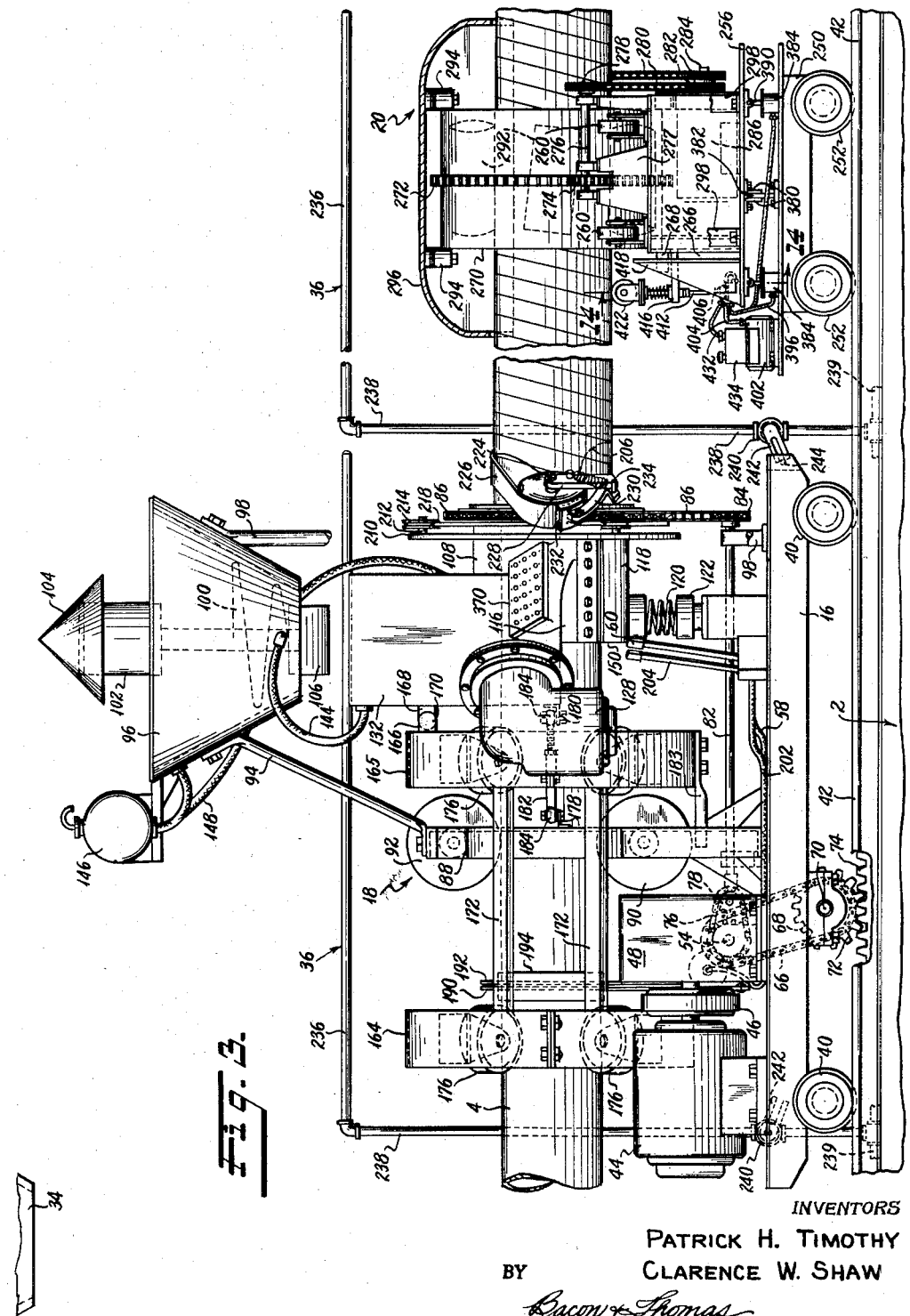

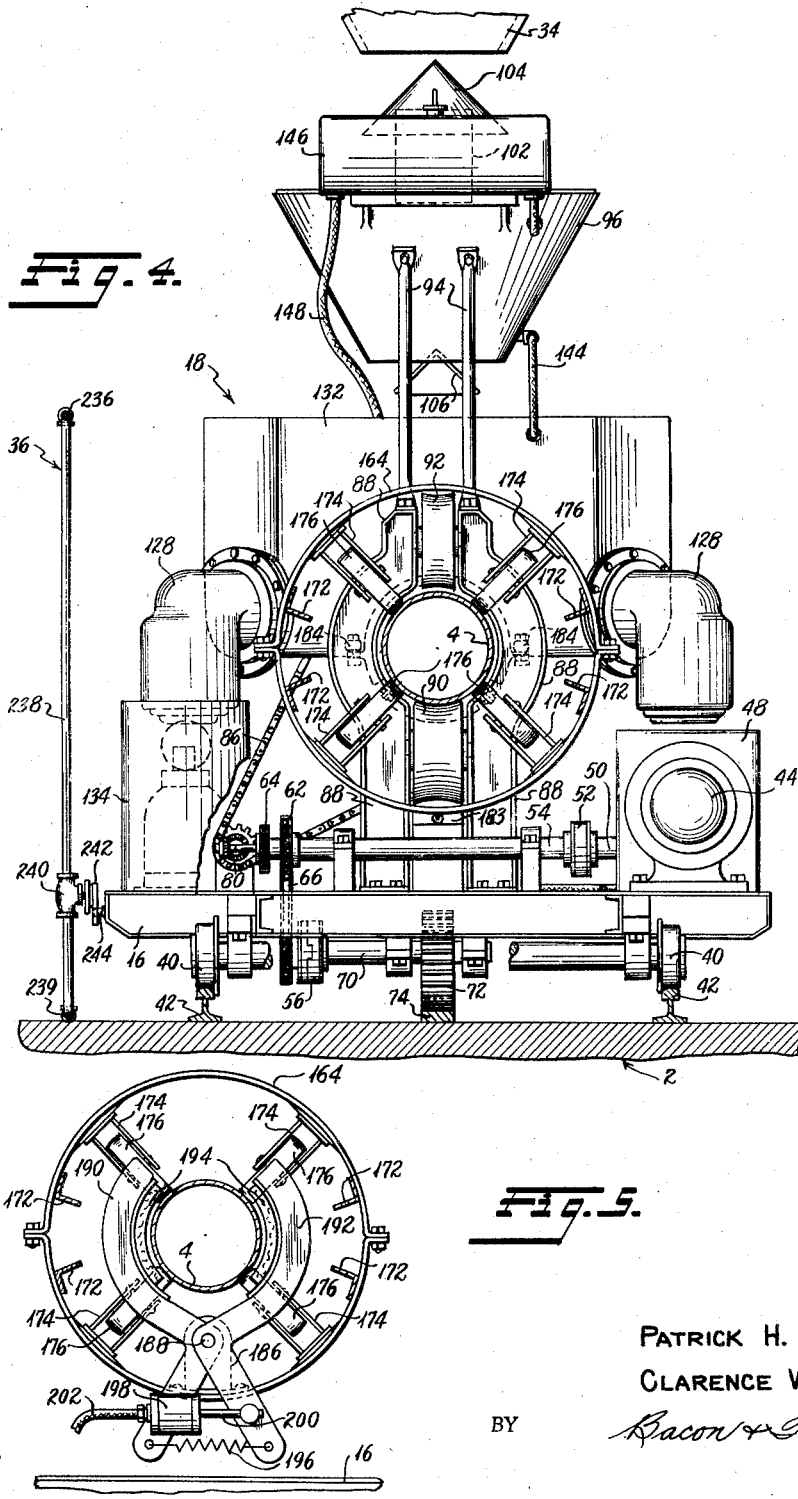

Dec. 9, 1958  P. H. TIMOTHY ET AL  2,863,204
PIPE COATING METHOD AND APPARATUS
Filed March 8, 1955  6 Sheets-Sheet 4
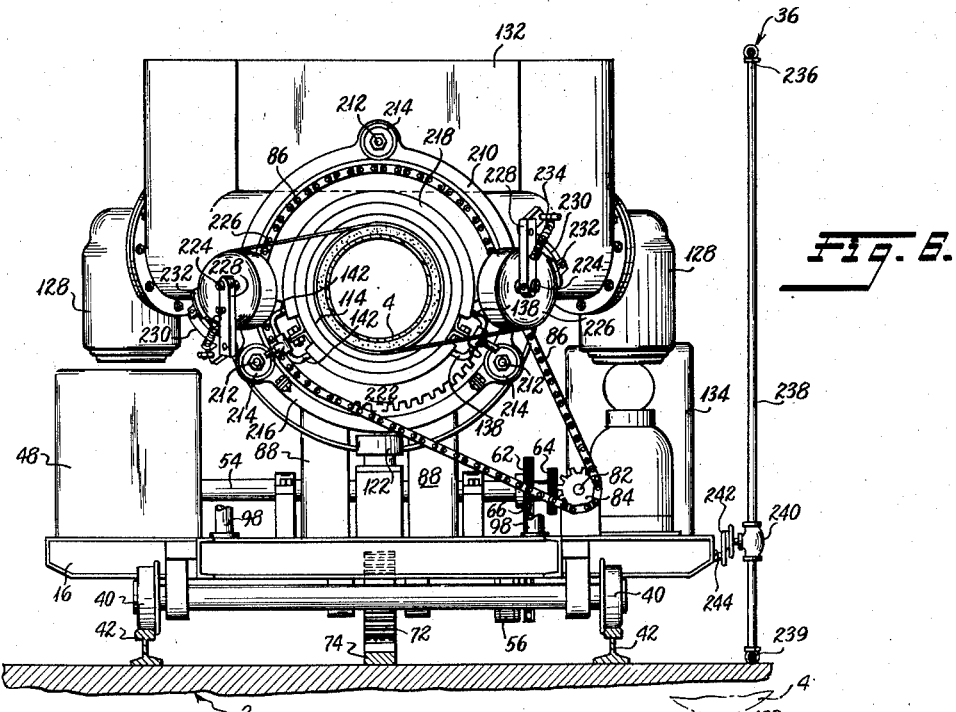
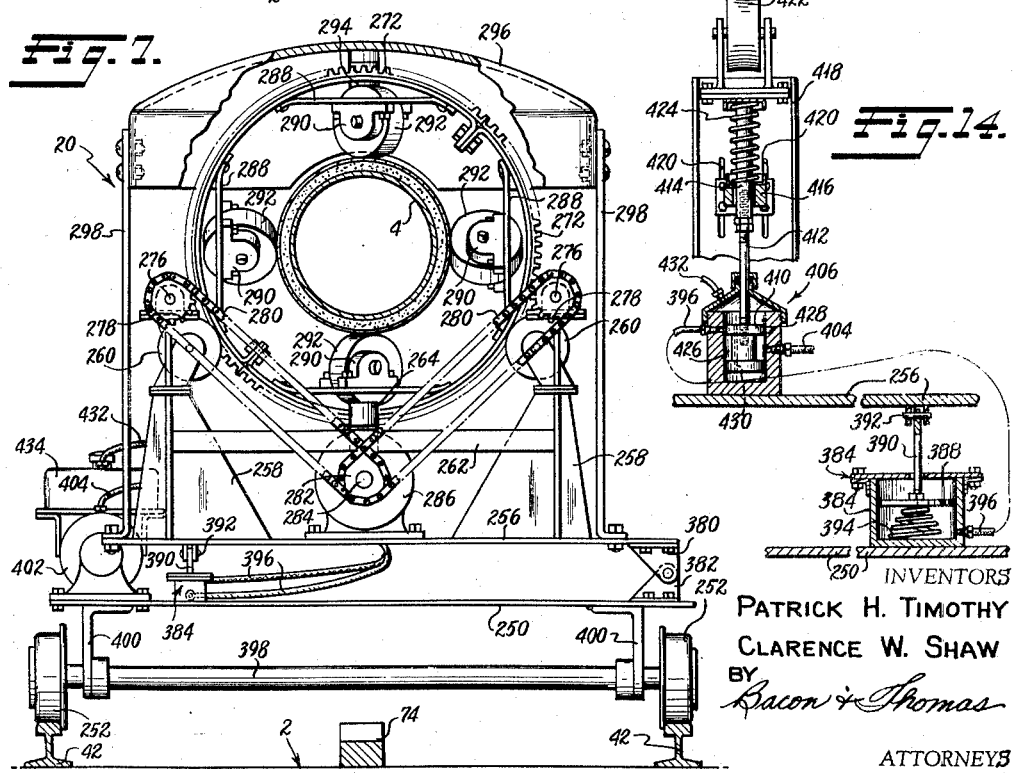
INVENTORS
PATRICK H. TIMOTHY
CLARENCE W. SHAW
BY
Bacon & Thomas
ATTORNEYS

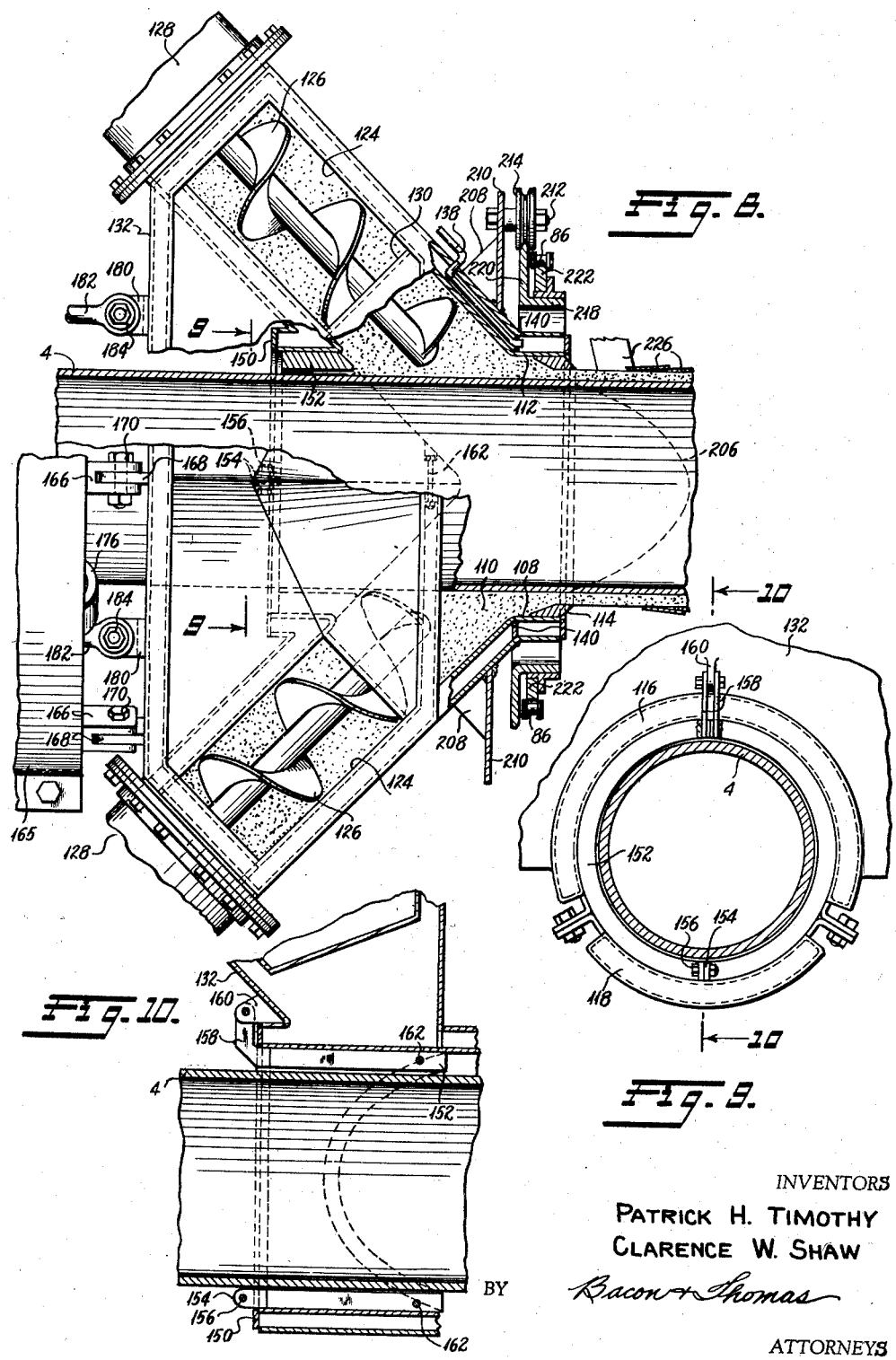

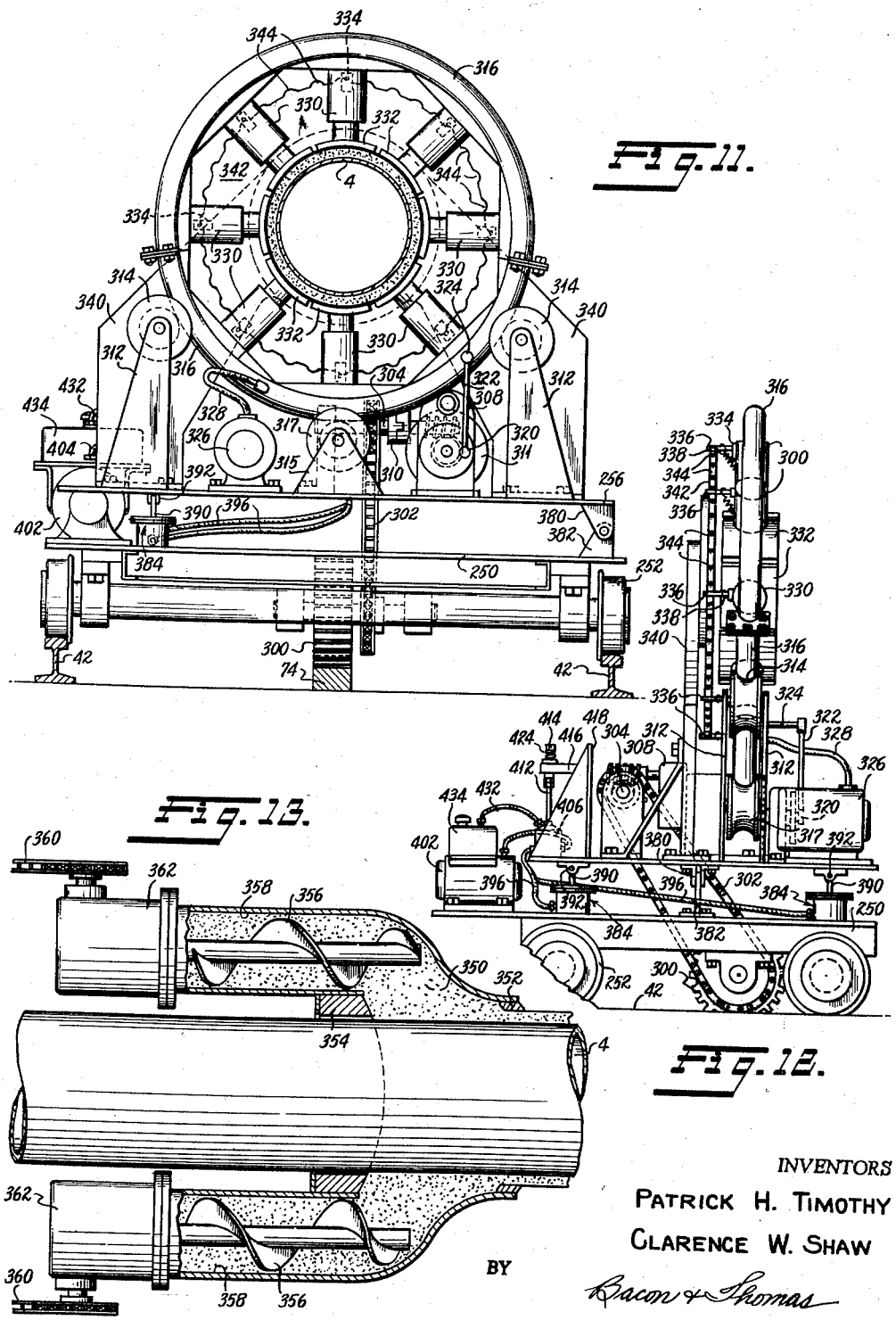

United States Patent Office 2,863,204
Patented Dec. 9, 1958

2,863,204

PIPE COATING METHOD AND APPARATUS

Patrick H. Timothy, New Orleans, La., and Clarence W. Shaw, Picayune, Miss., assignors, by mesne assignments, to Southern Natural Gas Company, Birmingham, Ala., a corporation of Delaware Application March 8, 1955, Serial No. 492,931

34 Claims. (Cl. 25—38)

This invention relates to a method and apparatus for coating continuous pipe with a thick layer of heavy mastic material. It is contemplated that the mastic material be of sufficient density and applied sufficiently thick so that the total weight of the pipe and mastic coating will be great enough to cause an empty pipe to sink to the bottom of a body of water and remain there under the maximum static and/or dynamic uplifts that will occur.

The invention relates to a method and apparatus for coating a continuous length of pipe being lowered to position at the bottom of a body of water. While the illustrations and description herein relate specifically to apparatus for coating pipe over a body of water and lowering the same to the bottom, it is to be understood that the invention is of such breadth as to include performance of these operations on shore for coating either the individual joints before welding them together or the continuous pipe after welding and then lowering the continuous pipe either in an open trench on land or in a dredged trench in swamps or the like.

It has long been recognized as desirable to provide apparatus for assembling and coating continuous lengths of pipe while laying the same in their final environment. It has become particularly desirable to extend pipe lines from offshore well sites to shore installations, but one of the principal difficulties heretofore has been in providing sufficient weight and anchorage for such pipe lines that they do not float to the surface of the body of water or become displaced by wave action. Several methods have been used, such as coating steel pipe with a concrete coating to provide the required weight or attaching concrete or cast iron clamps at spaced positions along the pipeline to provide the required weight. The continuous coating of pipe with a concrete sheath has proven unsatisfactory since the coating must necessarily be done above the surface of the water and it has been found that the flexure necessary to lower the pipe to the bottom results in cracking the concrete coating and later corrosion and destruction of the pipe. In waters subject to wave action, concrete coated pipe can not be laid in depths exceeding 12 to 18 feet, depending on the section modulus of the pipe, without seriously damaging the concrete coating.

According to the present invention, applicant coats steel pipe with a high density but flexible coating mastic of sufficient weight that a coating of reasonable thickness provides the necessary total weight to sink the empty pipe and hold the same in position on the bottom of a body of water, under the maximum conditions of flocculence and/or turbulence. The coating composition employed is fully disclosed and claimed in the copending application of Patrick H. Timothy, filed on March 8, 1955, and bearing Serial No. 491,834, now abandoned. In general, however, the coating composition comprises a bituminous mastic consisting of a heat-responsive binder, such as asphalt or the like, and a filler of heavy aggregate material and fiber reinforcing material, such as glass fibers. The aggregate may be crushed barium sulfate ore, or ilmenite (iron-titanium ore). Preferably, the aggregate material is ground to pass a 6-mesh screen and is provided with sufficient additional "fines" to provide an aggregate material wherein each size of particles are present in sufficient quantity to substantially fill the voids between particles of the next larger sizes. The "fines" referred to comprise powdered barium sulfate ore ground to pass a 200-mesh screen. With such aggregate material, a mastic employing a bituminous binder may be mixed which will have a very high density and will provide the required weight. The bituminous binder is heat responsive in that it may be heated to soften the mastic which can then be readily handled by suitable pumps and may be caused to flow as desired. Upon cooling, the bituminous binder hardens to a substantially solid condition to provide a very firm coating on the pipe. While the cold coating is quite firm and self-sustaining, it is yet of such flexibility that the steel pipe to which it is applied may be bent or flexed to stress the steel to its elastic limit without cracking or breaking the hardened mastic.

In applying the described mastic to a pipe in the thickness required, it has been found that conventional pipe coating apparatus is unsatisfactory. The apparatus of the present invention includes many features particularly adapting the apparatus for the handling of this heavy mastic and compacting the same on a pipe.

In addition to novel features of the mastic applicator and compacting mechanisms, the present invention includes a combination of devices peculiarly adapted to carrying out the continuous coating and pipe laying process desired.

In general, a vehicle, which may be a barge or a wheeled vehicle, is provided with means for assembling short lengths of pipe into a continuous pipe as the process proceeds and for sequentially coating increments of that pipe over the vehicle. The apparatus includes a carriage movable on the vehicle along the pipe thereon for applying the mastic coating to the pipe. When the carriage reaches one end of its path it is clamped to the pipe and the vehicle then moved longitudinally under the pipe and carriage to underlie a further uncoated portion of the pipe and the coating machine then assumes a position on the vehicle at the starting end of its coating path. The vehicle is then held stationary and the coating machine advanced therealong to coat a further increment of the pipe.

The coating machine includes mechanisms and elements adapted to merely apply a coating of the required thickness on the pipe and to support the same thereon without applying undue pressure to the material and without initially compacting the same to its maximum density. A separate compactor operable independently of the mastic applicator is also movable along the same path as the applicator to radially compact the supported coating on the pipe to achieve maximum density thereof by arranging the particles of aggregate in the mastic in a most compact arrangement within the voids of the next larger particles of aggregate.

Another feature of the invention lies in the applicator and compactor apparatus wherein they may be applied to or removed from an intermediate portion of a pipe without recourse to the ends thereof.

A novel characteristic of the applicator, which insures the application of a uniformly thick coating to the pipe, lies in an arrangement wherein mastic moving and extruding apparatus is arranged to apply and mold the mastic material to the surface of the pipe with the least possible pressure. Under these conditions, various conditions of viscosity of the mastic, due to changes in temperature, distribution of aggregate, etc., permit application of the layer of controlled thickness more easily when the mastic is more fluid and making it easier for the applicator to advance along the pipe. Drive means are provided for a carriage on which the applicator is mounted for movement along the pipe being coated and it is obviously important that the rate of movement of the carriage be related to the ease of application of mastic to the pipe to insure uniformity of the coating. If the carriage attempts to move faster than the rate at which the coating is being applied, the result will be a coating that is too thin or perhaps even cracked and ruptured. On the other hand, if the carriage tends to move too slow in relation to the rate of application of mastic for the pipe, undue pressure is built up in the confined body of mastic and after extrusion on the pipe it will expand unduly to form a coating thicker than is desirable. The apparatus of the present invention includes a first drive means for supplying mastic to the applicator and extruding the same on the pipe and separate drive means for propelling the carriage along the pipe. The latter drive means are designed to be load-responsive and thus the speed of the carriage is automatically varied in accordance with the rate of application of mastic material to the pipe.

The applicator includes means for maintaining a constant head of mastic material in the body being extruded on the pipe, means for supporting the lower portion of the extruded layer of mastic and means for wrapping a supporting band around the coated pipe before the supporting means have been withdrawn from below the mastic to thereby provide continuous support to prevent falling of the hot mastic from the pipe after issuance thereof from the applicator. Thereafter, separate and independently operable compacting means are operated to radially compact the wrapping and mastic on the pipe as previously indicated. The compactor is operable separately from and independently of movement of the carriage along the pipe whereby the operator may compact different portions of the coating to different degrees and in varying amounts as necessary to produce a uniformly densified finished coat securely bonded to the pipe. The compactor includes means to insure its concentricity to the pipe coating.

It is therefore an object of this invention to provide a novel method and apparatus for continuously coating a continuous pipe with a thick coating of heavy mastic material.

A further object of this invention is to provide mechanism for applying a thick, heavy coating of mastic material to a pipe wherein the material is applied to the pipe to a substantially uniform thickness without substantial pressure and is thereafter compacted to maximum density.

A still further object of this invention is to provide a method and apparatus for applying an unbroken continuous coating to a longitudinally immovable continuous pipe.

A further object of this invention is to provide a method and a pipe coating apparatus which will provide a weight coating material of such strength and flexibility that the pipeline can be laid in water subject to wave action to depths hitherto found impractical with a concrete coated pipeline without seriously damaging the coating.

A further object is to provide a compacting machine which will operate on a coated pipeline in such a way as to produce the maximum density of coating and also to greatly improve the mechanical strength of the material as well as the bond between the coating and the pipe wall.

Another object of this invention is to provide a pipe coating apparatus that may be applied to or removed from an intermediate portion of a length of pipe without recourse to the ends thereof.

It is still another object of this invention to provide a method and apparatus as set forth above including means for continuously supporting the coating on the pipe until it has solidified sufficiently to be self-sustaining.

An additional object is to provide apparatus having novel features peculiarly adapted to insuring the application of a uniformly thick layer of coating material to a pipe.

Another additional object of this invention is to provide novel compacting mechanism for radially compacting a coating mastic on a pipe.

Still another object of the invention is to provide novel means for cooling and solidifying a coating of mastic material progressively as it is applied to a pipe.

Another and further object of this invention is to provide apparatus for intermittently coating predetermined lengths of a continuous pipe with no breaks in the coating at the ends of the intermittently coated portions.

Additional and further objects and advantages will become apparent to those skilled in the art as the description proceeds in connection with the accompanying drawings, wherein:

Fig. 1 is a side elevational schematic view of a barge having the apparatus of the present invention thereon and illustrating a sequence of operations performed in assembling short lengths of pipe into one continuous length, coating the same and lowering the coated pipe to the bottom of a body of water;

Fig. 2 is a top plan view of a mastic applicator and compactor embodying the present invention;

Fig. 3 is a side elevational view of the apparatus shown in Fig. 2;

Fig. 4 is a transverse vertical sectional view taken substantially along the staggered line 4—4 of Fig. 2;

Fig. 5 is a fragmentary sectional view taken along the line 5—5 of Fig. 2;

Fig. 6 is an end elevational view of the applicator of Fig. 2 as viewed from the right end thereof;

Fig. 7 is an end elevational view of the compactor shown at the right hand end of Fig. 2;

Fig. 8 is a horizontal sectional view through a portion of the applicator taken substantially along the center line of a pipe being coated, certain parts being shown in elevation;

Fig. 9 is a vertical sectional view taken substantially along the line 9—9 of Fig. 8;

Fig. 10 is a fragmentary vertical sectional view taken substantially along the line 10—10 of Fig. 9;

Fig. 11 is an end elevational view of a modified form of compacting mechanism;

Fig. 12 is a side elevational view of the compactor shown in Fig. 11;

Fig. 13 is a schematic horizontal sectional view, similar to Fig. 8 but illustrating a modified arrangement of mastic pumps; and Fig. 14 is a fragmentary sectional view, on an enlarged scale, taken on the line 14—14 of Fig. 3.

Referring first to Fig. 1, 2 indicates a buoyant barge movable in a direction along the line of pipe being laid thereby. It is contemplated that the barge normally be held in fixed position by means of spaced anchors forwardly and rearwardly thereof and on opposite sides thereof by lines extending from suitable winches (not shown) on the barge to the various anchors. Obviously, by proper manipulation of the winches, the barge may be moved in any desired direction through any desired distance within the limits of length of the anchor lines. Obviously also, the anchors may be moved to different positions to thereby permit progressive incremental movement of the barge in the desired direction.

The barge is provided with a suitable supply rack holding a supply of previously cleaned and primed lengths of pipe 4. According to the present invention a length of pipe 4 is held in position to be welded, at 6, to the end of a continuous length of pipe extending rearwardly of the barge and over the end thereof to the bottom of the body of water. An incomplete weld is made at 6 but sufficient to support the end length of pipe 4 until the barge is moved to the left to position the incomplete weld at station 8 where the weld is completed. At station 10 the weld is inspected and repaired, if necessary. It is to be understood that during the practice of this process the barge is intermittently moved to the left a distance substantially equal to the length of one section 4 of pipe. The sections of connected pipe which are welded together are supported on the barge by rollers 12 to facilitate advance movement of the barge thereunder. From the station 10 the welded pipe extends rearwardly of the barge over a trackway 14 on which a carriage 16 moves. The trackway 14 is of a length about equal to the length of one section of pipe 4 plus the length required for the coating and compacting machines, and carriage 16 carries a mastic coating applicator 18 thereon. A compactor 20 is independently movable along the trackway 14.

From the rearmost end of the trackway 14 a second upwardly convex trackway 22 is provided and on which a supporting carriage or dolly 24 is movable. The barge is also provided with a cantilever trusswork 26 overhanging the rearmost end of the barge, and carrying supporting rolls 28. The coated pipe extends rearwardly from the compactor 20 over supporting carriage 24 to rest thereon and over rollers 28. From rollers 28 the coated pipe extends downwardly into the water onto underwater roller supports 30 suspended from spaced floats 32 which are, in turn, tied to the barge. Assuming the parts to be in the position shown in Fig. 1, with the barge anchor lines taut to hold the barge in fixed position, the applicator 18 is operated to apply a coating of mastic material to the pipe while moving along trackway 14 to the left. While the mastic is being applied to the pipe, a supporting wrapping is applied thereto and compactor 20 is caused to follow the applicator along the trackway and to radially compact the wrapped and coated pipe to the desired degree. The coating and wrapping continues with the barge stationary until the applicator reaches the left end of the trackway 14, whereupon the application of mastic to the pipe ceases and the applicator is not then moved relative to the pipe. It is, in fact, clamped to an adjacent uncoated portion of the pipe and held clamped thereto while the anchor lines of the barge are manipulated to advance the barge to the left a distance equal to one length of pipe 4. The applicator is provided with a supply hopper of a capacity sufficient to hold at least enough mastic material to coat one length of pipe and when the applicator has reached the left end of trackway 14 its hopper is positioned under main supply hopper 34 on the barge and during the interval of time when the barge is being prepared for forward movement an additional supply of mastic material is moved from the supply hopper 34 to the hopper on the applicator.

During movement of the barge forwardly the pipe resting on carriage or dolly 24 causes that carriage to move rearwardly along trackway 22 in supporting engagement with the coated pipe to a position adjacent the rear end of the barge. At the completion of the forward movement of the barge, the left end of the endmost section 4 of pipe, shown in Fig. 1 as overlying the supply rack, moves to station 6 ready to receive an additional section to be welded to its end and each previous weld moves rearwardly relative to the barge to the next station. Thus uncoated sections of the pipe are sequentially positioned over the trackway 14. It will be obvious that, during forward movement of the barge, the trackway 14 is moved forwardly under carriage 16 to reposition applicator 18 and compactor 20 at the rear end of the trackway 14 for commencement of the next coating cycle. After the barge has been advanced one step, the supporting carriage 24 is actuated to lower its pipe-engaging saddle and to then move forwardly to the position of Fig. 1, whereupon the saddle is raised into pipe-engaging position, where it remains during the coating cycle.

A series of spray devices 36 are arranged along the trackway 14 and movement of carriage 16 along the trackway operates to activate the spray devices 36 sequentially to spray a coolant on sequential increments of coated pipe after the coating has been applied thereto and wrapped. The spray devices are, as stated, sequentially operated as the coating machine advances to the left but are sequentially "shut off" as the barge is moved forwardly past the applicator 18 so that coolant is not sprayed on the applicator 18 itself or on uncoated portions of the pipe, all as will be described in more detail hereafter. A spray system 38 is also arranged to continuously spray the coated pipe overlying trackway 22 and extending rearwardly from the barge to about the position where the pipe enters the water.

The trackway 22, carriage 24, trusswork 26, rollers 28 and floats 32 and their associated structures comprise means for lowering the coated pipe to the bottom of the body of water in a controlled manner and constitute the subject matter of the copending application of Patrick H. Timothy, filed on April 26, 1955, bearing Serial No. 504,066.

Reference is now made to Figs. 2 to 6 wherein the applicator 18 on carriage 16, and compactor 20, are shown in detail. The carriage 16 comprises a platform having flanged rollers 40 journalled thereon and supporting the carriage 16 for movement on parallel rails 42 constituting the trackway 14 of Fig. 1.

A traction motor 44 is mounted on carriage 16 and its output shaft drives through a fluid coupling 46 to a suitable reduction gear assembly 48. The output shaft 50 of the reduction gear 48 is connected through a suitable flexible coupling 52 to a shaft 54 journalled on the carriage 16 transversely thereof. The shaft 54 carries a pair of sprocket wheels 62 and 64. The sprocket wheel 62 drives through a sprocket chain 66 to a sprocket wheel 68 comprising one side of a clutch 56 on a shaft 70 journalled below the platform of carriage 16. The clutch 56 is hydraulically actuated whereby to selectively connect sprocket wheel 68 to shaft 70. A suitable conduit 58 for clutch actuating pressure fluid extends from the clutch 56 to a clutch control lever 60. The shaft 70 also has a gear 72 keyed thereto and in mesh with a longitudinally extending rack bar 74 extending along trackway 14 substantially midway between rails 42. The sprocket wheel 64 drives through a sprocket chain 76 to a sprocket wheel 78 for driving a bevel gear assembly 80 and a longitudinally extending shaft 82 journalled on the carriage 16. At its other end, the shaft 82 carries a sprocket wheel 84 which drives through a chain 86 to a wrapping head to be described in more detail later.

The operator may selectively actuate clutch lever 60 to engage or disengage clutch 56. When clutch 56 is engaged, the motor 44 may be started to simultaneously drive the carriage 16 along rails 42 and rotate the wrapping head in timed relation to advance movement of the carriage 16. The fluid coupling 46 is provided to permit variations in the speed of advance of the carriage, as will be described later. The fluid coupling 46 is provided since its characteristics, which are well known, result in adjustment of the carriage speed to the resistance to such movement by permitting slippage in the coupling. The fluid coupling is further advantageous in that it permits motor 44 to attain a substantial high speed and thus develop a substantial torque upon starting of the carriage. As an alternative, the motor 44 could be a motor whose speed is determined by the torque load such that greater loads result in lower speeds of motor operation.

The carriage 16 is provided with a pair of removable upright posts 88 of the configuration clearly shown in Fig. 4. A roller 90 journalled between the posts 88 supports the pipe 4 a fixed distance above the carriage and in substantially centralized relation thereto. The posts 88 extend upwardly above the pipe 4 and roller 92 is journalled between the upper end portions of the posts. The roller 92 is normally spaced above the upper surface of the pipe 4 and acts to prevent the pipe rising any substantial distance above the roller 90 during operation of the apparatus. The rollers 90 and 92 are readily separable from at least one of the posts 88 whereby the posts 88 may be unbolted from the carriage 16 and separated to permit removal of the apparatus from the midportion of a pipe or application thereto. At their upper ends the posts 88 support brackets 94, to the upper ends of which a hopper 96 is removably secured. The hopper 96 is also supported by posts 98 extending downwardly therefrom directly to the platform of the carriage 16. The hopper 96 is preferably of conical shape and is provided with a screw feed device 100 driven by a motor 102. The motor 102 may be remotely controlled, by means not shown, to be actuated at a desired constant rate or to be stopped at will, for a purpose to be set forth later. Fig. 3 shows the pipe coating machine as it approaches the left end of trackway 14 wherein its hopper 96 will underlie the delivery spout of supply hopper 34, previously referred to. In that position a supply of mastic material may be delivered from supply hopper 34 to the hopper 96 and a protective hood 104 is provided over motor 102 to deflect the mastic material away from motor 102 during its movement into hopper 96. The delivery end of hopper 96 is provided with a generally V-shaped flow divider 106 to divide the mastic material flowing downwardly from hopper 96 into two streams, all for a purpose to be set forth hereinafter.

The mastic applicator comprises wall means 108 defining a generally annular chamber 110 (see Fig. 8) surrounding the pipe 4 being coated. The chamber 110 terminates at its rear end in a circular orifice 112 in which a nozzle or extruding ring 114 is positioned. The inner diameter of the nozzle or ring 114 is of greater diameter than the pipe 4 by an amount equal to twice the thickness of the coating to be applied. The means defining chamber 110 include an upper portion 116 (see Fig. 3) and a lower complementary portion 118 removably secured to the upper portion whereby the chamber may be separated into two parts for removal from or application to the intermediate portion of a pipe. The lower portion 118 rests on a compression spring 120 which, in turn, rests on a suitable adjusting mechanism 122 carried by the carriage 16. In this manner, the chamber surrounding the pipe is resiliently supported from the carriage 16 whereby it may move limited amounts vertically and laterally to maintain nozzle ring 114 in true concentric relation to the outer surface of the pipe 4. Referring again to Fig. 8, the upper portion 116 of the chamber is formed to provide a pair of outwardly extending passageways 124 in which are positioned helical conveyors or pumps 126. Each of the helical conveyors or pumps is driven independently of the other, by a suitable gear motor 128. The outermost portions of the passageways 124 are open upwardly and define inlets 130 for mastic material. The inlet openings 130 communicate with opposite sides of the bottom portion of a hopper means 132 adapted to hold a supply of mastic material for gravity delivery to the pumps or conveyors 126. The hopper means 132 is located directly below the hopper 96 on carriage 16 and the flow divider 106, previously referred to, is arranged to direct the streams of mastic material to positions at the sides of the hopper means 132 directly overlying the inlet openings 130. In this manner the supply of mastic material, which may be relatively thick and viscous, is delivered into position to most efficiently flow into the pump or conveyor passageways. The wall means defining the chamber 110, annular orifice 112, passageways 124, hopper means 132 and the supply hopper 96 are of double-wall construction defining hollow jackets surrounding the chamber, pump, passageways and hoppers.

As indicated in Fig. 6, the nozzle or extruding ring 114 is likewise of two parts whereby it may be removed from the pipe 4 or applied thereto without recourse to the ends of the pipe.

In Fig. 2, 134 indicates a heater for a suitable heating medium such as oil and schematically indicates a suitable heat exchanger for heating that oil to the desired high temperature. 136 indicates a suitable motor-driven pump for pumping oil heated in 134, through conduits not shown, to inlet fittings 138 (Fig. 6). The inlet fittings 138 communicate, respectively, with the hollow jacketed portions of the upper and lower portions 116 and 118 of the hollow jackets defining the annular orifice 112 (Fig. 8). Suitable baffle walls 140 confine the heating medium to circumferential flow around the orifice portion 112 to the opposite sides of the respective upper and lower portions thereof where the medium then flows through outlet fittings 142 (Fig. 6) to suitable conduits directing that heating medium into the jackets about the pump or conveyor passageway, the remainder of the jacket around chamber 110, the jacket around the hopper 132, thence through a conduit 144 (Fig. 3) into the jacket of hopper 96 and from there to a supply tank 146 and to return line 148 leading to the heat exchanger 134 and pump 136. By the structure described, heated fluid is first directed to the portion of the jacket surrounding nozzle ring 114 to thereby maintain that ring at a high temperature to facilitate extrusion of the coating mastic therethrough and for providing a relatively highly "polished" surface on the extruded mastic material. The hoppers and passageways are thus also heated to maintain the bituminous mastic at a relatively high temperature to facilitate flow thereof and extrusion on the pipe. It is contemplated that all of the apparatus handling the mastic material before its extrusion on the pipe will be heated to maintain the mastic at the desired degree of fluidity.

Referring now to Figs. 8, 9 and 10, the jacket defining the upper and lower portions of the chamber 110 is of generally cylindrical shape and extends rearwardly from the juncture of the chamber 110 and the passageways 124 to a rear terminal edge 150. The inner diameter of the chamber 110 is substantially greater than the outer diameter of the pipe 4 and mastic material would extrude rearwardly of the open end of the chamber 110 except for the provision of a baffle ring 152. The baffle ring 152 is generally of the shape of a hollow cylindrical wedge split axially from the apex of the wedge to the base thereof. The apex portions of the baffle ring 152 extend along the pipe above and below the same so that the edges of the wedge define substantial continuations of the passageways 124. The baffle ring 152 is provided with ears 154 extending rearwardly thereof at the bottom of the ring whereby they may be releasably secured together by bolts 156 or the like. Rearwardly and upwardly extending spaced ears 158 are provided on the rearmost portions of the ring 152 at the top thereof and adjacent the abutting edges of the two portions of the ring. The ears 158 may be bolted, in embracing relation, to a bracket 160 secured to the rear wall of hopper 132. In this manner the ring 152 is held in assembled relation to the mastic applicator and in concentric relation to the pipe 4 but may be readily removed and separated for application to or removal from the intermediate portion of a pipe. If desired, the apex portions of the ring sections may be clamped together by transverse bolts 162. The inner diameter of the baffle ring 152 is somewhat greater than the outer diameter of the uncoated pipe 4. Since the continuous pipe is made up of sections 4 welded together in end-to-end relation, a circumferential bead invariably exists at the weld and clearance is thus provided between baffle ring 152 and the pipe sections 4 whereby the weld beads may readily enter the chamber 110. The radial clearance between ring 152 and the outer surface of pipe 4 is sufficiently small, however, and of sufficiently great axial length to offer high resistance to flow of mastic material therethrough and constitutes, in effect, a highly efficient seal against extrusion of the mastic material outwardly of the terminal end 150 of the applicator. It will be remembered that, during the coating operation, mastic material is being fed into chamber 110 at a rate just sufficient to supply material for the extruded coating as the applicator moves to the left as viewed in Fig. 8. The mastic material, being highly viscous and quite adhesive, adheres to the surface of the pipe 4 and relative movement of the pipe 4 to the right through chamber 110 tends to overcome any tendency of the mastic to flow to the left between ring 152 and the pipe. This is particularly true since the rate of operation of the pumps or conveyors 126 as related to the rate of advance of the chamber over the pipe is such that no substantial internal pressure is built up in the mastic material in chamber 110.

The chamber 110 surrounds the pipe 4 but nozzle ring 114 and baffle ring 152 are both of greater diameter than the pipe 4 and must be held in truly concentric relation to the pipe during the coating process to insure a uniformly thick coating on all sides of the pipe. An aligning head is provided for holding the chamber in the required concentric relation to pipe 4 and comprises a pair of annular ring structures 164 and 165. Each of the ring structures is formed in two parts whereby they may be separated and applied to or removed from an intermediate portion of the pipe. The ring 165 is provided with ears 166 (Fig. 8) extending axially of its upper portion toward the hopper 132. The rear wall of the hopper 132 is provided with corresponding ears 168 in its upper portion. Pins or bolts 170 extend through aligned openings in the ears 166 and 168 to hold the ring 165 in rigid relationship to the hopper 132 and therefore chamber 110. There are at least three sets of the securing ears arranged in circumferentially spaced relation throughout about one half the circumference of the ring 165 to thereby hold the ring 165 in rigid relation to the hopper 132 but separable therefrom.

Longitudinally extending angle members 172 are welded or otherwise rigidly secured to the rings 164 and 165 to hold corresponding portions of those rings in rigid axially aligned relationship. The securement between ring 165 and hopper 132 and the relationship of the angle members 172 to the rings 164 and 165 is such that the rings are rigidly held in concentric coaxial relation to the nozzle ring 114 and baffle ring 152.

Each of the rings 164 and 165 is further provided with inwardly extending brackets 174 on which rubber-tired rollers 176 are journalled. The upper section of each ring carries two of the brackets 174 and rollers 176 and the lower separable portion of each ring likewise carries a pair of brackets 174 and rollers 176. Preferably, the rollers 176 are mounted on adjustable axes (not shown) whereby they may be radially adjusted in the rings to initially set the nozzle ring 114 exactly concentric to the outer surface of the pipe. The rubber-tired rollers 176 bear directly on the outer surface of the pipe 4 and since those rollers are not only arranged in circumferentially spaced relation but are also grouped in axially spaced relation, it will be obvious that the rollers 176 hold the assembly comprising rings 164 and 165 and angle members 172 in fixed coaxial relation to the pipe 4 but free to move longitudinally thereof. Since the means defining chamber 110 are rigidly fixed to the ring 165, it will therefore be obvious that the chamber and extruding nozzle 114 is held at all times substantially truly concentric to the pipe 4 during advance of the coating machine along the pipe. That will be true even though there are deviations in pipe diameter, straightness, or sag and even though portions of the tracks 42 are not truly parallel to the pipe axis. The spring support 120, previously described, permits limited lateral and vertical movement of the chamber 110 and associated mechanisms relative to the carriage 16 so that the coating apparatus may respond to the guiding influence of the rollers 176 independently of the position of carriage 16, and even though the major portion of the weight of the applicator is axially spaced from the roller 90, that weight does not produce a bend in the pipe or misalignment of nozzle 114 since the spring 120 is of such strength and so adjusted as to almost exactly balance the weight supported thereby.

The upright posts 88, on which rollers 90 and 92 are mounted, are each also provided with a bracket 178 (Figs. 2 and 3) at approximately the height of the pipe center but on laterally opposite sides thereof. In axial alignment with the brackets 178, the rear wall of the hopper 132 is provided with brackets 180. Adjustable links 182 extend from the brackets 178 to the brackets 180 and are pivoted to their respective brackets by suitable ball and socket connections 184. Since the posts or standards 88 are fixedly mounted on carriage 16, clearly the links 182 are effective to enforce axial movement of the chamber 110 and its guiding structure along the pipe 4 in response to movement of carriage 16 along tracks 42 while yet permitting limited lateral and vertical movement of the chamber 110 relative to the carriage 16.

A reaction arm 183 (Fig. 3) is secured to the lower portion of ring 165 and extends to a position between posts 88. The arm 183 acts to limit rotation of the chamber 110 and rings 164 and 165 around the pipe in response to torque forces applied to the wrapping mechanism by sprocket chain 86.

As previously described, during a portion of the cycle of operation of the apparatus of this invention, the pipe coating apparatus including carriage 16 is to be clamped rigidly to the pipe 4. For this purpose a brake (Figs. 2 and 5) is provided. The lower portion of guiding ring 164 carries a bracket 186 rigidly mounted therein and providing a pivot 188 for a pair of brake levers 190 and 192. Each of the brake levers is provided with an arcuate portion extending partially around the pipe 4 and each is provided with a suitable friction block 194. The portions of the brake arms below the pivot 188 diverge downwardly and outwardly and a tension spring 196 extends between the lower ends and at all times urges the brake blocks 194 away from pipe 4. Brake setting mechanism includes a hydraulic cylinder 198 pivotally mounted on the lower arm of brake lever 190 and having a piston therein (not shown) provided with a piston rod 200 extending to and pivoted on the lower arm of brake lever 192. A suitable conduit 202 for hydraulic fluid communicates with the interior of the cylinder 198 and extends to a suitable hydraulic actuator controlled by brake lever 204 (Fig. 2). Thus by proper manipulation of the brake lever 204, at the desired time, hydraulic pressure may be transmitted along conduit 202 into cylinder 198 to thereby force the piston rod 200 outwardly of the cylinder and forcibly clamp the brake blocks 194 to the pipe 4. With the brake thus set, and clutch 56 disengaged, the entire pipe coating machine is clamped to the pipe against axial movement therealong. With the parts so set, the barge 2 may be moved as previously described without moving the carriage 16.

The hydraulic actuator controlled by the clutch lever 60 and the brake lever 204 may be any suitable type in which swinging movement of the lever 60 or 204 actuates a piston in a master cylinder to transmit fluid under pressure along the respective conduits 58 or 202 to actuate the clutch 56 or the brake, as desired. Hydraulic actuating mechanisms for the clutch and brake have been described but are merely illustrative of a suitable actuating arrangement, it being understood that mechanical linkages or any other desirable means may be employed for this purpose.

The mastic material extruded by ring 114 on the pipe 4 is rather hot and relatively soft as it issues from the nozzle. Due to that fact the material is of relatively low viscosity and there is danger of at least the lower portion of the coating dropping away from pipe 4 as it issues from the nozzle 114. To insure against separation of the coating from the bottom of the pipe, a supporting lip 206 (see Figs. 3 and 8) is fixedly mounted on the end of the chamber 110 to project outwardly axially of the nozzle ringe 114. The supporting lip 206 comprises a platelike member curved arcuately in concentric relation to the pipe 4 but spaced from the lower surface thereof a distance slightly greater than the thickness of the coating applied. Thus, the upper surface of the curved lip 206 lies slightly below the bottom surface of the coating material at it issues from the nozzle 114 and thus permits the mastic to expand slightly in a radial direction to relieve internal pressures existing therein. After such slight radial expansion, which may be of the order of 1/16 inch, the mastic material immediately contacts and rests on the supporting lip 206. As is evident from Figs. 3 and 8, the supporting lip 206 extends axially outwardly of the nozzle for a substantial distance and supports the mastic coating during its travel for a substantial distance outwardly of the nozzle. As will be described hereafter, a spirally wrapped supporting band is applied to the outer surface of the coating and over the lip 206 to provide mechanical support for the coating as it passes off the lip 206 and thus insure that the coating be not unsupported at any time.

The portion of the double-walled jacket surrounding chamber 110 in the general region of the nozzle 114 is provided with brackets 208 (Fig. 8) welded or otherwise rigidly fixed thereto and rigidly and fixedly supporting a ring structure 210 (see also Fig. 6). The ring structure 210 is provided with a plurality of circumferentially spaced trunnions 212 on which grooved rollers 214 are journalled. The ring structure 210 may extend throughout 360° and have a removable lower portion 216 (Fig. 6) or may extend only to the position of the two lowermost rollers as shown in Fig. 6, with the portion 216 completely omitted. An annular rotor 218 (Fig. 8) is provided with an outwardly extending flange 220 positioned with its outer periphery in the grooves of rollers 214. In this manner the annular rotor 218 is rotatably supported about the axis of pipe 4. The rotor 218 is constructed of two generally semicircular portions removably secured together and each portion has mounted thereon a semicircular portion of a sprocket wheel 222. The portions of the sprocket wheel 222 are complementary and together define a complete sprocket wheel on which sprocket chain 86 (previously described) is trained. The sprocket chain 86 is, as described, driven in timed relation to advance movement of carriage 16 along tracks 42. In that manner rotation of the annular rotor 218 is in timed relation to the movement of carriage 16.

The annular rotor 218 carries a pair of outwardly diverging stub shafts 224 (Fig. 6) rigidly mounted thereon. Each of the stub shafts 224 rotatably supports a roll of flexible material 226. Preferably, the material 226 consists of a woven band of glass fiber textile material. The axis of each roll 226 is so angularly related to the axis of pipe 4 that rotation of the rotor 218 about the axis of the pipe as the carriage 16 advances along tracks 42 causes the band material to be spirally wrapped on the coating material with slightly overlapping edges. As is evident from Figs. 3 and 8, the bands 226 are wrapped over the coating material and in contact therewith throughout the upper portion of the pipe but are wrapped over the outer or lower surface of the supporting lip 206 below the pipe. As the carriage advances along the pipe 4 and wrapping proceeds, the contact between the wrapped material 226 and the mastic coating throughout the upper portion of the pipe causes the wrapping material to adhere somewhat to the coating and therefore advance of the coating machine along the pipe causes supporting lip 206 to be withdrawn from between the mastic and wrapped bands whereby the bands immediately take over mechanical support of the coating as soon as the lip 206 is withdrawn and the bottom portion of the coating is thus never permitted to hang freely from the pipe and no reliance is placed on the strength of the hot and soft coating itself for support.

The outermost ends of the stub shafts 224 removably receive brackets 228 which may be clamped thereto in the illustrated position. Each bracket 228 pivotally supports a generally L-shaped brake arm 230 having a brake shoe 232 bearing on the outer periphery of the roll of material 226. Tension springs 234 are anchored at one end to the brackets 228 and at their other ends to the short arms of the brake arms 230 to resiliently urge brake shoes 232 against the material 226 and thus provide for adequate tension in the bands being wrapped on the coated pipe. Preferably, the springs 234 and brake arms 230 are so configured and related that the forces of springs 234 act through increasingly effective lever arms, as the diameter of the rolls decreases, to maintain the pressure on brake shoes 232 substantially constant and thereby insure substantially constant tension in the wrapping.

As previously described, a plurality of spray heads 36 are arranged along the tracks 42. Referring particularly to Fig. 3, each spray head comprises a short horizontally arranged pipe 236 supported by a stand pipe 238. Each stand pipe 238 is connected to a supply pipe 239 on or below the deck of the barge and is further provided with a control valve 240 at about the level of the carriage 16. Each valve 240 is provided with a slotted actuator arm 242 arranged in the path of movement of a pin or finger 244 extending laterally from the adjacent side of carriage 16 (see also Figs. 2, 4 and 6). The arrangement is such that when a slotted arm 242 swings to the left as seen in Fig. 3, its valve 240 is opened, whereas when the arm 242 is swung to the right, as seen at the left side of Fig. 3, its valve 240 is closed. Thus, as coating and wrapping proceeds from right to left as seen in Fig. 3, the pin or finger 244 on carriage 16 sequentially opens valves 240 and thus activates the spray heads 36 controlled thereby to spray a coolant, preferably water, on the hot mastic coating just applied to the pipe. In this manner incremental lengths of the coated pipe are cooled after coating but the spray is not directed onto the coating machine itself. After the carriage 16 has travelled the full length of trackway 14 to a position at the left end thereof (as seen in Fig. 1) all of the spray heads 36 are activated to continually cool the length of pipe coated during that cycle. When the coating machine is clamped to the pipe 4 and the barge moved forwardly, the barge carries the spray heads 36 with it and sequentially moves the opened valves 240 in the opposite direction past finger 244 on carriage 16. Therefore, as the barge is being advanced under the carriage 16, the valves 240 are sequentially closed in the reverse order of their opening and the spray heads 36 are deactivated before the coating machine enters the spray therefrom. By the time the coating machine reaches a position, relative to the barge, for commencement of a new coating cycle, all of the spray heads are deactivated and are again thereafter sequentially activated by advance of the coating apparatus along trackway 14.

Referring now to Fig. 7, the compactor 20 previously referred to is shown as comprising a carriage 250 supported by flanged wheels 252 on tracks 42. The platform 256 is provided with brackets 380 (Figs. 3 and 7) midway of its length and on one side thereof, which brackets are fixed to the platform 256 and pivoted to a bracket 382 on the carriage 250. Thus, the platform 256 is pivotally mounted on the carriage 250 on a longitudinal axis at one side thereof whereby the platform is mounted for movement toward and from the pipe 4. The other edge of platform 256 is supported by a pair of hydraulic motor devices 384 (see also Fig. 14) each comprising a cylinder 386 having a piston 388 therein and a piston rod 390 extending upwardly to pivot 392 on the platform 256. A spring 394 is mounted in each cylinder 386 and bears against piston 388 to at least partially support the weight of the pivoted platform 256. Preferably the springs 394 are of such strength as to support about one half the total weight of the mechanism mounted on platform 256. A conduit 396 for pressure fluid communicates with each cylinder 386 below the piston 388, for a purpose to be described later.

The wheels 252 which support the carriage 250 are mounted on axles 398 (Fig. 7) journalled in brackets 400 on the carriage 250. The axle 398, between wheels 252 is of greater length than the distance between the outermost sides of brackets 400 to thus permit the carriage 250 to slide laterally along the axles 398 a limited amount. By this mounting it will be seen that the compactor mechanism on platform 256 may be moved vertically and/or laterally to permit positioning the compactor exactly concentric to the pipe 4, even though the pipe deviates a substantial amount from exact parallelism to the tracks 42.

The platform 256 is provided with a pair of upstanding brackets 258 (Fig. 7) to the upper ends of which axially aligned supporting rolls 260 are journalled. There are two of the rolls 260 on each side of the carriage, each pair of rolls being laterally spaced a substantial distance laterally of the axis of pipe 4. The brackets 258 also support a transverse member 262 which rotatably supports a roller 264 arranged to rotate on a vertical axis. The forward end of the platform 256 is provided with an upstanding bracket 266 (Fig. 3) which, in turn, rotatably supports a roller 268 for rotation on a vertical axis axially spaced from the roller 264.

A hollow cylindrical ring 270 of substantial axial length rests on the supporting rolls 260 and is rotatably supported thereby for rotation about the axis of pipe 4. The position of rollers 260 and the dimensions of cylinder 270 are such that the cylinder 270 is normally substantially concentric to the pipe 4. The cylinder 270 is provided with a ring gear 272 on its outer periphery between axially spaced rolls 260, which ring gear meshes with gears 274 carried by shafts 276 journalled on upwardly extending portions 277 of brackets 258. The gears 274 are slightly below the axis of the cylinder 270. Each of the shafts 276 has a sprocket wheel 278 fixed thereto and over which sprocket chains 280 are trained. The sprocket chains 280 are driven by adjacent sprocket wheels 282 on shaft 284 driven by a motor 286 mounted on platform 256. Thus, rotation of the shaft 284 by motor 286 causes the gears 274 to rotate the cylinder 270 about the axis of pipe 4. The provision of gears 274 on opposite sides of the gear 272 results in substantial balance between forces that would otherwise tend to lift cylinder 270 off at least some of its supporting rollers 260. The motor 286 is reversible whereby it may be driven in either direction, at will. The cylinder 270 and ring gear 272 are formed of complementary semicylindrical portions whereby the cylinder and ring gear may be separated for removal from or application to an intermediate portion of the pipe 4. Each semicylindrical portion of the cylinder 270 is provided with pairs of chordally arranged leaf springs 288. Each leaf spring 288 is provided with a bracket 290 in which an end of a roller 292 is journalled. The rollers 292 are of substantial axial dimension (see Figs. 2 and 3) and are arranged on brackets 290 to rotate on axes oblique to the axis of pipe 4. The leaf springs 288 are so stressed as to urge the rollers 292 radially inwardly into pressure contact with the wrapped mastic coating on pipe 4.

Referring now particularly to Figs. 3, 7 and 14, the carriage 250 is provided with a suitable motor 402 operating a hydraulic pump, which may be a gear pump (not shown) having a discharge conduit 404. The arrangement is such that the motor 402 may operate continuously and supply constant and uniform pressure in conduit 404, it being contemplated that a bypass pressure control arrangement be provided between the inlet and the outlet of the pump in any well-known manner.

A control valve 406 is mounted on the platform 256 under the center of the pipe 4. The control valve comprises a generally cylindrical body portion 408 and a spool valve 410 therein. The spool valve 410 is actuated by a rod 412 extending upwardly to where it is adjustably connected to a feeler slide 414. The slide 414 is slidably mounted in a member 416 adjustably supported on a bracket 418 fixed to the platform 256. Member 416 is secured to the bracket 418 by means of bolts passing through slots 420 in the bracket 418. At its upper end the slide member 414 carries a feeler roller 422 in position to engage the lower surface of the wrapped coating on the pipe. A spring 424 surrounds the slide member 414 and bears at one end against its guide 416 to thus urge the roller 422, and, therefore, spool valve 410 upwardly. The member 416 may be vertically adjusted to precompress spring 424 the desired amount. The spool valve 410 comprises upper and lower lands defining an annular chamber 426 therebetween. The conduit 404 extending from the pump driven by motor 402 communicates with the chamber 426 to deliver pressure fluid thereto. The valve cylinder 408 is further provided with an annular groove or passageway 428 normally covered by the upper land of the spool valve and communicating, through conduits 396, with the chambers below the hydraulic motor pistons 388 previously referred to. The spool valve 410 is also provided with a longitudinal passageway 430 therethrough providing communication between the spaces above and below the spool valve. The space above the spool valve communicates, through vent conduit 432, with a supply tank 434 at the pump previously referred to. The supply tank 434 supplies hydraulic fluid to the pump.

For the following description, assume that the conduits 396 extending from the control valve 406 to the hydraulic motors 384 are filled with fluid under pressure and that the upper land of the spool valve covers the groove 428 to trap that fluid in the motors and thereby provide substantially rigid and non-resilient support for the platform 256. As compaction of the coating progresses lengthwise of the pipe 4, and since the pipe is supported at spaced points on opposite sides of the compactor, there will be some sag in the pipe between its points of support and its axis will, therefore, not be truly parallel to the tracks 42. As the compactor moves along a coated pipe, if it approaches a portion of the pipe nearer the tracks 42, greater pressure will be exerted by the lower compacting rolls 292 and thus cause the springs 288 supporting the lower compacting rolls to flex more than the springs 288 then at the top of the pipe. Thus, the pipe 4 will not be truly concentric to the cylinder 270 but will have moved downwardly somewhat relative to the center of that cylinder. Such relative downward movement depresses feeler roll 422 and thereby depresses spool valve 410 in cylinder 408 sufficiently to provide communication between conduit 396 and the chamber above the spool valve. This will vent pressure fluid from the hydraulic motors back to the supply tank 434 and permit platform 256 to drop or lower itself. When the platform 256 moves downwardly it carries the valve cylinder 408 with it to position the valve cylinder in such position that the upper land of the spool valve 410 again covers the groove 428 and thus downward movement of the platform 256 is arrested after it has moved downwardly a distance corresponding to the original downward movement of feeler roll 422.

As the compactor progresses along the pipe to a position where the pipe moves upwardly away from track 42, compressing the compactor roll springs 288 at the top of the compactor, the feeler roll 422 moves upwardly and moves spool valve 410 upwardly to provide communication between conduit 396 and the chamber 426. In this condition pressure fluid is conducted from the pump through conduit 404, chamber 426 and conduit 396 to the hydraulic motors to lift the platform 256 and valve cylinder 408 until the upper land of the spool valve again covers groove 428, whereupon upward movement of the platform stops and the compacting rolls 292 are again positioned truly concentric to the pipe 4.

It is important that the compacting cylinder 270 be maintained as nearly as possible concentric to the pipe 4 to avoid imposing greater pressure on the bottom of the coating than at the top, or vice versa, either of which would result in forcing the coating to an eccentric position on the pipe.

While the platform positioning means has been described as a hydraulic follow-up mechanism, it is clearly within the scope of this invention to employ compressed air instead of a pressure liquid. In adapting the device for using compressed air, no supply tank 434 is necessary and the conduit 432 may vent directly into the atmosphere.

The rollers 264 and 268, previously described as being arranged to rotate on vertical axes, engage opposite end edges of the cylinder 270 to prevent axial movement of the cylinder 270 on supporting rolls 260. Thus axial movement of the cylinder 270 along the pipe results in corresponding movement of carriage 250 along rails 42. Additional rollers 294, arranged to rotate on vertical axes, engage the end edges of cylinder 270 at the top thereof to assist the rollers 264 and 268. The rollers 294 are journalled on suitable pins or axles carried by a hood 296 which is, in turn, supported on platform 256 by uprights 298 (see Fig. 7). The hood 296 prevents cooling spray from the spray heads 36 from landing on the compactor carriage, motor and related mechanisms to thereby protect those parts from damage by the coolant material.

Since the rollers 292 are arranged on oblique axes, it will be obvious that rotation of the cylinder 270 about the pipe and pressure contact between the oblique rollers 292 and the mastic coating will result in radial compaction of the coating and simultaneous traction advance of the cylinder 270 along the coated pipe. Advance of the cylinder 270 along the coated pipe is produced by the angular positioning of pressure rollers 292. The direction of advance of the cylinder 270 and carriage 250 along the pipe depends upon the direction of rotation of the cylinder 270. Thus, by reversing the direction of rotation of motor 286, the operator may selectively cause the compactor and carriage to move in either direction along the coated pipe. Thus, the operator may compact certain portions of the coating more than others, as becomes necessary to provide a uniformly compacted coating on the finished pipe.

As previously described, the mastic material consists of a heavyweight aggregate in different sizes and a binding material. To obtain maximum density of the coating it is necessary that the aggregate be so arranged that progressively smaller particles thereof substantially fill the voids between the next larger particles. The ordinary mixing and handling of the mastic material will not, in itself, result in that arrangement of aggregate particles but the compacting apparatus just described will rearrange the particles of aggregate to such positions that maximum density is obtained. Furthermore, the compacting of the coating, as described, forces the mastic into firm and intimate contact with the entire surface of a priming coat on the pipe and thus insures the best possible bond between the coating and the pipe.

Figs. 11 and 12 illustrate an alternate form of compactor that may be employed. In this modification the carriage 250 supported by flanged wheels 252 may be identical to that of Fig. 7 but is further provided with a traction gear 300 journalled thereon in position to mesh with the rack 74 previously described. The gear 300 is driven, through sprocket chain 302 from a shaft 304 driven by a speed reducing mechanism 308, on motor 311, through clutch 310. The motor 311 is also reversible whereby the carriage may be driven in either direction along the tracks 42. The clutch 310 is provided whereby the motor 311 may be disconnected from the sprocket chain 302 to thereby place the traction drive in "neutral." Carriage 250 of this modification is provided with the same supporting and follow-up means previously described for supporting and moving platform 256, in the same manner as described in connection with the previous modification.

Laterally spaced standards 312 on platform 256 support concave rollers 314 for rotation about axes parallel to the pipe 4 and central bracket 315 rotatably supports a concave roller 317. A hollow annular manifold 316 rests on and is rotatably supported by rollers 314 and 317 for oscillation about the axis of the pipe 4. The motor 311 is provided with a further gear reducing unit (not shown) driving a crank pin 320 to which a pitman rod 322 is journalled. The other end of the pitman rod 322 is pivotally connected to a peripheral portion of the annular manifold 316, as at 324. As the crank pin 320 is driven by motor 311, the pitman 322 causes the manifold 316 to oscillate about the axis of pipe 4. The manifold 316 is formed of two sections whereby it may be separated to facilitate removal from or application to an intermediate portion of the pipe 4. A suitable motor driven compressor 326 is mounted on the platform 256 and, through conduit 328, supplies the interior of the manifold 316 with compressed air.

Extending radially inward from the annular manifold 316 is a plurality of cylinders 330. In each cylinder is a piston (not shown) extending outwardly therefrom and terminating in an impact head 332 of generally arcuate shape complementary to the outer surface of the mastic coating on pipe 4. Suitable spring means (not shown) are provided to normally retract the pistons radially away from the pipe 4. Suitable passageways are provided to conduct compressed air from the manifold 316 into each of the cylinders and each of those passageways is controlled by a valve 334 having a control arm 336 (see Fig. 12) swingable in a radial plane to open or close the valve. A spring 338 normally urges each of the control arms 336 to swing radially inwardly to place the valve in closed condition. Upstanding brackets 340 on platform 256 support a cam ring 342 in concentric relation to the manifold 316 but axially spaced therefrom. The cam ring 342 is provided with a series of spaced lobes 344 circumferentially spaced around its outer periphery and projecting into the path of oscillatory movement of the control arms 336. The total angle of oscillation of the manifold 316 is such that each valve control arm 336 moves past a plurality of the cam lobes 344 during each stroke in each direction. By this means oscillation of the manifold 316 about the axis of pipe 4 will result in periodic opening of the valves 334 to admit compressed air to the cylinders 330 and thereby cause the heads 332 to apply a radial impact force to the mastic coating on the pipe 4. Since the impact heads 332 are distributed throughout the periphery of the pipe, it will be obvious that a complete ring of the coating material may be constantly impacted to densify the same. The operator may, at will, control movement of carriage 250 along the tracks 42 by manipulation of the clutch 310 and the reverse controls for motor 311. In this manner he may control the length of time and extent of compaction of any portion of the coated pipe.

It is contemplated that the compactor shown in Figs. 11 and 12 be provided with a hood, similar to the hood 296 shown in Figs. 3 and 7, to protect the motors and mechanism from the coolant spray.

Fig. 13 illustrates a modified arrangement of mastic pumps. The pumps shown in Figs. 2 and 8 extend obliquely of the axis of the pipe into the chamber 110.

In Fig. 13 the chamber 350 is provided with an extruding nozzle 352, which may be identical to the nozzle ring 114 of Figs. 1 through 8, and is provided at its forward end with a baffle ring 354 which may be similar to the baffle ring 152 of Figs. 8 to 10. In this modification, however, the helical conveyors or pumps 356 are arranged in passageways 358 leading to chamber 350 but extending substantially parallel to the axis of the pipe 4 rather than at an oblique angle thereto. The modification of Fig. 13 lends itself readily to driving the conveyors or pumps 356 from a single power source through sprocket chains 360 and suitable gear boxes 362. In all other respects, the mastic applicator of Fig. 13 may be substantially identical to that previously described. This modification, however, offers some advantages in that the apparatus does not extend so far laterally of the machine and is somewhat less bulky and much of the weight of the pump or conveyor mechanisms is placed closer to the pipe supporting roller 90.

It is contemplated that all functions of the coating apparatus, including all mechanisms on carriage 16 and the compactor of either Fig. 1 or 11 along with the functions of the supporting carriage or dolly 24 (Fig. 1) be controlled from a central station by a single operator. Preferably, the operator's station is on the carriage 16 at a place from which levers 60 and 204 are readily accessible and a position from which a control panel 370 (Fig. 3) is also readily accessible. The control devices on the panel 370, which may be push buttons, switches, valves or the like, permit the operator at this station to control the rate of feed of mastic from hopper 96 to hopper 132, to control the operation of pump motors 128, to control operation of the heat exchanger 134 and pump 136, to control tractive movement of the dolly 24 along trackway 22, and to control raising and lowering of the pipe-supporting saddle on the dolly 24. The control panel 370 also provides means for remotely controlling all controllable functions of the compactor 20 whether it be the form shown in Fig. 1 or the alternative form of Fig. 11. The drawings do not illustrate control connections from the carriage 16 to the dolly 24 or the compactor 20 but it will be recognized that many known devices may be employed for effecting such remote control.

With the apparatus and controls thus far described, the operator of the coating machine may observe and control all of the functions involved in the coating cycle. For instance, with the parts shown in the position of Fig. 1 wherein a length of uncoated pipe is in position and ready to be coated, the operator may first start the mastic pumps 126 and immediately thereafter release brake 194, engage clutch 56 and start motor 44. By virtue of the fluid coupling 46, or its equivalent, the carriage 16 will start to advance at the correct rate to permit the pumps 126 to deposit the right amount of mastic material on the pipe and to maintain a constant supply inwardly of the extruding ring or nozzle 114. Coating of the pipe then progresses and during its progression the operator may observe the level of mastic material in the hopper 132 and may exercise constant control of the feed screw 100 to maintain that level substantially constant and in this manner control the weight imposed on spring 120 to further insure concentricity between nozzle 114 and pipe 4. During the coating operation the coating is supported by the lip 206 and wrapping 226. After a substantial length of pipe has been coated to the left from the position of Fig. 1, the operator may commence operation of the compactor and control its speed of movement along trackway 14 to effect the desired compaction of the coated pipe without regard to the speed of travel of carriage 16. The compactor may actually move forwardly and reverse during continued forward movement of the carriage 16, all under the control of the operator until the required length of pipe has been coated and compacted to the left end of trackway 14. During progress of the coating operation, the spray heads 36 are brought sequentially into operation as described to cool and solidify the coating as quickly as possible. After the pipe has been coated to the left end of trackway 14, the operator stops motor 44, disconnects clutch 56 and applies brake 194 and at the same time stops the operation of pumps 126 and feed screw 100. In that position he may replenish the supply of mastic in hopper 96 from main supply hopper 34 and may continue operation of the compactor until the coating has been compacted up to the applicator. Thereafter the movement of the barge in a forward direction causes the carriage 16 to move relative to the barge in a rearward direction without changing its position relative to the pipe 4 until the parts reach the position of Fig. 1 for the commencement of a new coating cycle. With the compactor of Fig. 1, the movement of the barge relative to the pipe will also move the barge under the compactor carriage since the rollers 192 in friction contact with the pipe coating prevent movement of the carriage 250 with the barge. With the form of compactor shown in Fig. 11, the operator will have to exercise control of the traction motor of the compactor to cause it to advance along the trackway 14 during movement of the barge to maintain the compactor in a relatively fixed position relative to the pipe. As an alternative, suitable brake means could be provided for the compactor of Fig. 11 or the compactor carriage could be secured temporarily to carriage 16 to prevent its movement along with the barge and possible damaging collision with carriage 16.

After the barge has been moved the full extent of its forward movement, the dolly 24 will have passed along trackway 22, in supporting relation with the coated pipe, to the rearmost end of that trackway. By that time the carriage 16 will have reached the right end of trackway 14 and its roller 90 functions as support for the pipe at the rear end of trackway 14. The dolly 24 may then be manipulated by the operator to return to the position shown in Fig. 1 and provide support for the pipe at that point as the supporting roller 90 moves forwardly of the barge during the coating cycle.

While a limited number of embodiments of the invention have been shown and described herein, it is to be understood that the illustrations and description are merely illustrative of the invention, which is not limited to the specific embodiments but encompasses all modifications and equivalents falling within the scope of the appended claims.

We claim:

1. Apparatus for coating continuous longitudinally immovable pipe, comprising; a vehicle adapted to be moved over a supporting medium in the direction of length of said pipe, means on said vehicle for supporting a portion of said continuous pipe thereover, a carriage movable along a fixed path on said vehicle in said direction and adjacent said pipe, coating means on said carriage arranged to surround said pipe and apply a protective coating thereto as said carriage moves along said path, and power means for selectively propelling said carriage along said path.

2. Apparatus as defined in claim 1 wherein said power means comprises a toothed rack fixed to said vehicle along said path, a gear journalled on said carriage and meshing with said rack, and motor means on said carriage arranged to selectively rotate said gear.

3. Apparatus as defined in claim 1 including means for selectively fixedly securing said carriage to said pipe against movement longitudinally of said pipe whereby said vehicle may be moved in said direction and relative to said pipe and carriage to position said path adjacent an uncoated portion of said pipe.

4. Apparatus as defined in claim 1 including wrapping means on said carriage for wrapping a retaining band helically on the coated portion of said pipe closely adjacent said coating means, said power means being arranged to drive said wrapping means in timed relation to movement of said carriage along said path.

5. Apparatus as defined in claim 1 including a plurality of spray means on said vehicle arranged in spaced relation along said path for spraying a coolant on said coated pipe, and control means operable by movement of said carriage along said path in one direction to successively activate said spray means, said control means being responsive to relative movement between said carriage and vehicle along said path in the other direction for successively deactivating said spray means in the reverse order of their activation.

6. Apparatus as defined in claim 5 wherein said control means comprise a plurality of valves, one for each spray means, each valve having a movable actuating member extending across the path of movement of a portion of said carriage.

7. Apparatus as defined in claim 1 including hopper means on said carriage for supplying said coating means with coating material as said carriage moves along said path, and a supply hopper on said vehicle adjacent one end of said path, said supply hopper having delivery means arranged to deliver a supply of coating material directly to said hopper means when said carriage is at said one end of said path.

8. Apparatus as defined in claim 1 including compacting means for compacting said coating on said pipe, said compacting means being mounted on an independent carriage movable along said path, and power means for actuating said compactor and propelling said independent carriage along said path.

9. Apparatus as defined in claim 8 including means on said carriage defining an operator's station, and manually operable independent control mechanisms at said station for said motor means and for said compactor.

10. In a pipe coating machine, a carriage movable along a pipe to be coated, applicator means on said carriage and movable therewith for applying a layer of coating material concentrically around said pipe, centering means for holding said applicator in substantially fixed radial relation to a pipe, said centering means including resilient means supporting said applicator on said carriage, said applicator including a first hopper thereon for directing coating material to said pipe, hopper means fixedly mounted on said carriage and arranged to deliver coating material to said first hopper, and means for controlling the rate of delivery of coating material from said hopper means to said first hopper whereby the total weight supported by said resilient means may be maintained substantially constant.

11. A pipe coating machine as defined in claim 10 wherein said centering means also includes a guide head removably secured to said applicator and having rollers thereon engageable with said pipe, and support means on said carriage having a roller thereon in position to engage and support a pipe a fixed distance above said carriage at a position longitudinally spaced from said resilient means.

12. A pipe coating machine as defined in claim 11 wherein said support means comprises a pair of standards releasably secured to said carriage, said standards extending upwardly on opposite sides of said pipe, said roller being journalled between said standards below said pipe, said roller being releasable from at least one of said standards, a second roller journalled between said standards and normally spaced above said pipe, said second roller being also releasable from at least one of said standards whereby the standards of said support means and their rollers may be separated to permit applying said support means to, or removing the same from an intermediate portion of a pipe without requiring access to an end thereof.

13. A pipe coating machine as defined in claim 10 wherein said applicator includes material moving means on opposite sides of said pipe, said material moving means being arranged to respectively receive material from opposite sides of said first hopper, and means associated with said hopper means to divide the material delivered thereby and direct substantially equal portions thereof toward each of said material moving means.

14. In a pipe coating machine, a carriage movable axially of a pipe to be coated, means on said carriage defining a chamber adapted to be positioned in spaced surrounding relation to a pipe to be coated, an extruding nozzle at one end of said chamber adapted to surround a pipe to be coated in concentric spaced relation thereto, material moving means arranged to move a coating mastic into said chamber and out through said nozzle, first drive means for said material moving means, independent drive means for moving said carriage along said pipe, said independent drive means including a load-responsive variable speed output device whereby the speed of movement of said carriage along said pipe varies in accordance with the rate of flow of mastic through said chamber and nozzle under the influence of said first drive means.

15. A pipe coating machine as defined in claim 14 wherein said load-responsive device is a fluid coupling.

16. In a coating machine for applying a thick coating of heavy mastic to a pipe, means defining a chamber adapted to be positioned in spaced surrounding relation to a pipe to be coated, an extruding nozzle at one end of said chamber adapted to surround a pipe to be coated in spaced relation thereto, material moving means on opposite sides of said chamber, each arranged to force coating mastic into said chamber along a path above the axis of said nozzle, said paths extending in a generally horizontal direction and converging toward said nozzle, a hopper over said chamber and separate passageways leading from said hopper to each of said material moving means.

17. A pipe coating machine as defined in claim 16 wherein each of said material moving means comprises a screw conveyor in a passageway leading to said chamber, the axis of each being oblique to the axis of said pipe.

18. A pipe coating machine for applying a thick layer of mastic to a pipe, an extruding nozzle through which said pipe extends, means for relatively moving said pipe and mastic material relative to said nozzle to cause said nozzle to extrude a thick annular layer of said mastic on said pipe, and a supporting lip extending outwardly from said nozzle below said coated pipe in position to slidably engage and support the lower portion of said coating, said supporting lip comprising a stationary and relatively thin platelike member curved concentrically to said pipe, and means arranged to helically and continuously wrap a band of flexible material around said coated pipe closely adjacent said nozzle in contact with said mastic material around the upper portion thereof and in contact with the lower surface of said supporting lip at the bottom portion thereof whereby said wrapped band slides off said lip, as said coated pipe advances through said nozzle, and into supporting engagement with the mastic at the lower portion of said pipe as said mastic slides off the supporting surface of said lip.

19. Apparatus for compacting a mastic coating on a pipe, comprising, a carriage guided for movement along a path generally parallel to the axis of said pipe, an annular member supported on said carriage in concentric surrounding relation to said pipe, said annular member being mounted on said carriage for rotational movement around the axis of said pipe, and circumferentially spaced means on said annular member for engaging and compacting said coating in response to rotational movement of said member about said pipe, and power means on said carriage for rotationally moving said annular member and for moving said carriage along said path.

20. Apparatus as defined in claim 19 wherein means, including springs, on said carriage movably support a platform thereover, laterally spaced rollers journalled on said platform, said annular member resting on said rollers and being rotationally supported thereby.

21. Apparatus as defined in claim 19 wherein said annular member is mounted on a platform, means mounting said platform on said carriage for movement toward and from said pipe, feeler means movably mounted on said compactor and engageable with said coated pipe to detect changes in the distance between said pipe and carriage, and follow-up means responsive to movement of said feeler means for moving said platform toward or from said pipe to position said annular member in concentric relation to said pipe.

22. Apparatus as defined in claim 21 wherein said means for moving said platform includes a hydraulic motor, a valve carried by said platform and controlling said hydraulic motor, said feeler means being arranged to operate said valve.

23. Apparatus as defined in claim 22 wherein said platform is pivoted to said carriage on a longitudinal axis at one side thereof, said hydraulic motor being arranged to swing said platform about said axis.

24. Apparatus for compacting a mastic coating on a pipe, comprising, a carriage guided for movement along a path generally parallel to the axis of said pipe, an annular member supported on said carriage in concentric surrounding relation to said pipe, said annular member being mounted for rotation about the axis of said pipe, a plurality of circumferentially spaced rollers journalled in said annular member on axes oblique to the axis of said pipe, resilient means urging said rollers radially inwardly of said annular member into pressure contact with the mastic coating on said pipe, and power means on said carriage for rotating said annular member to thereby cause said rollers to compact said mastic coating and advance said carriage along said path.

25. Apparatus as defined in claim 24 wherein said power means is selectively reversible whereby said carriage may be caused to move along said path in either direction while compacting said coating.

26. Apparatus as defined in claim 24 wherein said annular member comprises releasably connected semicylindrical portions, laterally spaced rollers on said carriage, said annular member resting on and being rotatably supported by said rollers.

27. Apparatus as defined in claim 26 wherein said annular member includes means defining a ring gear around its periphery and wherein said power means comprises a gear journalled on each side of said carriage in mesh with said ring gear, a power source on said carriage, and power transmission means connecting said power source to both of said gears.

28. A method of coating continuous longitudinally immovable pipe comprising, the steps of: supporting an uncoated portion of said pipe over a vehicle, holding said vehicle stationary, applying a protective coating to a predetermined length of said portion of said pipe by mechanism movably supported by said vehicle while moving said mechanism on said vehicle and along said pipe, clamping said mechanism to said pipe and moving said vehicle, relative to said pipe and mechanism, to underlie a different uncoated portion of said pipe, and thereafter holding said vehicle stationary, releasing said mechanism from said pipe, and repeating said steps.

29. A method of coating pipe with a thick coating of heavy mastic comprising, the steps of; maintaining a body of mastic material under slight and substantially uniform pressure around said pipe, causing said pressure to extrude a thick concentric layer of said material around said pipe while relatively moving said body and said pipe in the direction of length of said pipe, and varying the rate of said relative movement between said body and said pipe in accordance with changes in the flow characteristics of said material, by increasing or decreasing said rate as the fluidity of said material respectively increases or decreases whereby said substantially uniform pressure extrudes a layer of substantially uniform thickness on said pipe.

30. The method defined in claim 29 including the steps of; supporting the bottom portion of said extruded layer adjacent said body, wrapping a supporting band around said layer and over said supported portion, and then withdrawing said support from inside said band as said body moves along said pipe.

31. The method defined in claim 29 including the steps of; applying a supporting layer of material over said extruded layer to physically support said extruded layer on said pipe, and thereafter radially compacting said layers on said pipe to produce maximum density and strength thereof, and bond to said pipe.

32. In a pipe coating machine, a support, driving means for producing relative axial movement between said support and a pipe to be coated, applicator means, including a power source independent of said driving means, on said support for applying a layer of coating material concentrically around said pipe, centering means for holding said applicator in substantially fixed radial relation to said pipe, said centering means including resilient means entirely supporting said applicator with its power source on said support, said applicator including a first hopper thereon and supported by said resilient means for directing coating material to said pipe, hopper means fixedly mounted on said support and arranged to deliver coating material to said first hopper, and means for controlling the rate of delivery of coating material from said hopper means to said first hopper whereby the total weight supported by said resilient means may be maintained substantially constant.

33. In a pipe coating machine, a support, actuating means for producing relative axial movement between siad support and a pipe to be coated, means on said support defining a chamber adapted to be positioned in spaced surrounding relation to said pipe, an extruding nozzle at one end of said chamber adapted to surround said pipe in concentric relation thereto, material moving means arranged to move a coating mastic into said chamber and out through said nozzle, first drive means for said material moving means, independent drive means for said actuating means arranged to relatively move said support and pipe so that said pipe passes outwardly through said nozzle, said independent drive means including a load-responsive variable speed output device to increase the speed of said relative movement when the load thereon is lessened whereby the speed of the relative movement between said pipe and support varies in accordance with the rate of flow of mastic through said chamber and nozzle under the influence of said first drive means.

34. The method of coating pipe with a thick coating of heavy mastic comprising, the steps of; extruding a thick concentric layer of mastic around said pipe at an extruding station, relatively moving said pipe and station in the direction of the pipe axis, supporting the bottom portion of said layer at and adjacent said station, wrapping a supporting band around said layer and over said supported portion, and then withdrawing said support from inside said band as said pipe and station are relatively moved.

References Cited in the file of this patent

UNITED STATES PATENTS

| | | |
|---|---|---|
| 1,322,464 | Oden | Nov. 18, 1919 |
| 2,053,307 | Wilson | Sept. 8, 1936 |
| 2,186,361 | Bryan et al. | Jan. 9, 1940 |
| 2,236,757 | Lines | Apr. 1, 1941 |
| 2,287,836 | Postlewaite et al. | June 30, 1942 |
| 2,369,858 | Ryan | Feb. 20, 1945 |
| 2,372,162 | Ryan | Mar. 20, 1945 |
| 2,414,524 | Harris et al. | Jan. 21, 1947 |